(12) United States Patent
Wang et al.

(10) Patent No.: US 9,683,741 B2
(45) Date of Patent: Jun. 20, 2017

(54) FIRED HEATER AND METHOD OF USING THE SAME

(71) Applicants: CHINA PETROLEUM & CHEMICAL CORPORATION, Beijing (CN); LUOYANG PETROCHEMICAL ENGINEERING CORPORATION/SINOPEC, Luoyang (CN)

(72) Inventors: Derui Wang, Luoyang (CN); Liran Yang, Luoyang (CN); Tiefeng Zhang, Luoyang (CN)

(73) Assignees: CHINA PETROLEUM & CHEMICAL CORPORATION, Beijing (CN); LUOYANG PETROCHEMICAL ENGINEERING CORPORATION/SINOPEC, Luoyang (CN)

( * ) Notice: Subject to any disclaimer, the term of this patent is extended or adjusted under 35 U.S.C. 154(b) by 857 days.

(21) Appl. No.: 13/853,375

(22) Filed: Mar. 29, 2013

(65) Prior Publication Data
US 2013/0260324 A1 Oct. 3, 2013

(30) Foreign Application Priority Data
Mar. 29, 2012 (CN) .......................... 2012 1 0100669

(51) Int. Cl.
*F23L 15/00* (2006.01)
*F23C 9/00* (2006.01)
*F23J 15/02* (2006.01)

(52) U.S. Cl.
CPC ................ *F23L 15/00* (2013.01); *F23C 9/00* (2013.01); *F23J 15/022* (2013.01); *Y02E 20/348* (2013.01)

(58) Field of Classification Search
CPC . F23L 15/00; F23J 15/022; F23C 9/00; F28D 20/0056; F28D 2020/0078;
(Continued)

(56) References Cited

U.S. PATENT DOCUMENTS 3,184,223 A * 5/1965 Webber ............... F16K 11/0655
137/309
3,811,253 A * 5/1974 Austin ................... G01N 31/16
73/31.06

(Continued)

OTHER PUBLICATIONS

Y. Liang, "An Analysis and Experimental Study of the Properties of a New High Frequency Commutuation Ceramic Regenerative Heat Exchanger", Huazhong University of Science & Technology, Wuhan 430074, P.R. China, Jan. 2007 (17 pgs).

*Primary Examiner* — Avinash Savani
*Assistant Examiner* — Rabeeul Zuberi
(74) *Attorney, Agent, or Firm* — Buchanan Ingersoll & Rooney PC

(57) ABSTRACT

A fired heater includes a fired heater body with an air inlet and a flue gas outlet, and a flue gas waste heat recovery system communicated with the fired heater body and including at least two heat exchange chambers. A first port of each of the heat exchange chambers can be communicated with the flue gas outlet or the air inlet, and a second port of each of the heat exchange chambers can be communicated with the outside air or a fume extractor. When the first port of at least one heat exchanger chamber is communicated with the flue gas outlet and the second port thereof is communicated with the fume extractor, the first port of at least another heat exchange chamber is communicated with the air inlet and the second port thereof is communicated with the outside air.

18 Claims, 2 Drawing Sheets

(58) Field of Classification Search
CPC ...... F28D 20/006; F28D 19/04; F28D 17/026;
F28D 20/00; F28D 19/00; F28D 17/00
USPC .................................................. 165/9.1, 9.3
See application file for complete search history.

(56) References Cited

U.S. PATENT DOCUMENTS

| | | | | |
|---|---|---|---|---|
| 4,378,977 | A * | 4/1983 | Linde | B01D 53/1481 |
| | | | | 62/626 |
| 4,424,857 | A * | 1/1984 | Linde | F28D 17/00 |
| | | | | 165/5 |
| 4,671,345 | A * | 6/1987 | Masters | F23L 15/02 |
| | | | | 165/9.3 |
| 4,911,900 | A * | 3/1990 | Horch | B01D 53/56 |
| | | | | 423/235 |
| 5,928,412 | A * | 7/1999 | Bastholm | B01D 1/2818 |
| | | | | 422/170 |
| 5,944,504 | A * | 8/1999 | Tanaka | F23L 15/02 |
| | | | | 165/10 |
| 2008/0264612 | A1* | 10/2008 | Pellikka | F28D 7/06 |
| | | | | 165/104.28 |
| 2010/0242545 | A1* | 9/2010 | Richardson | C03B 5/235 |
| | | | | 65/335 |
| 2012/0024206 | A1* | 2/2012 | Varonen | F23C 6/045 |
| | | | | 110/348 |
| 2013/0260324 | A1* | 10/2013 | Wang | F23L 15/00 |
| | | | | 431/11 |

* cited by examiner

# FIRED HEATER AND METHOD OF USING THE SAME

TECHNICAL FIELD

The present invention relates to an industrial heating apparatus, particularly to a fired heater. The present invention also relates to a method of using the fired heater.

TECHNICAL BACKGROUND

A fired heater is a widely used process furnace in the fields of petroleum, petrochemistry, natural gas and metallurgy. The fired heater is gas or oil-fueled, and the heat carrier materials in the furnace pipe are heated directly by the flame to meet the temperature requirement for downstream equipments.

Currently, the exhaust gas temperature of a fired heater is generally high, normally within the range of 130~180° C., such that the thermal efficiency of the fuel is usually between 88% and 92%. Compared with a condensing boiler, a fired heater discharges flue gas containing a large amount of unutilized sensible heat and latent heat, causing an indirect waste of fuel, increasing the production cost and exerting a negative influence on the environment. Additionally, the flue gas discharged from the fired heater further contains water vapor, $SO_2$, etc. In discharging the flue gas, the water vapor condenses and dissolves the $SO_2$ to produce sulfurous acid, sulfuric acid, etc, which will corrode the entire exhaust equipment of the fired heater and pollute the environment as well.

In "Analysis of Property of a New Type Heat Exchanger with Ceramics Regenerator and High-frequency Switch by Experiment" (Yan Liang, Huazhong University of Science & Technology, Wuhan 430074, P.R.China, January, 2007), it disclosed a new ceramic regenerative heat exchanger using the high frequency commutation technology, wherein experimental tests on its heat exchange performance and resistance performance were carried out. Yan's experiments showed that the ceramic honeycomb regenerative air preheater could exchange heat between two fluids so as to recover the industrial exhaust heat efficiently. However, when this high frequency commutation ceramic regenerative heat exchanger is applied in a fired heater, where there is a switch between different heat exchange chambers, the furnace pressure and the furnace temperature of the fired heater would fluctuate. Moreover, because of the volume effect of the heat exchange chamber, the residual flue gas therein would re-enter into the fired heater and cause a flameout therein due to a lack of oxygen. These problems severely limit the application of the high frequency commutation ceramic regenerative heat exchanger in the field of the fired heater.

SUMMARY OF THE INVENTION

In order to solve the problems in the prior art, the present invention provides a fired heater, which has a relatively high thermal efficiency, a stable furnace pressure and a stable combustion state. The present invention further provides a method of using said fired heater.

According to a first aspect of the present invention, a fired heater is provided, comprising a fired heater body with an air inlet and a flue gas outlet, and a flue gas waste heat recovery system communicated with said fired heater body including at least two heat exchanger chambers. A first port of each of the heat exchange chambers can be communicated with the flue gas outlet or air inlet, and a second port of each of the heat exchange chambers can be communicated with the outside air or with a fume extractor, wherein, when the first port of at least one heat exchanger chamber is communicated with the flue gas outlet and the second port thereof is communicated with the fume extractor, the first port of at least another heat exchange chamber is communicated with the air inlet and the second port thereof is communicated with the outside air.

In the fired heater according to the present invention, at any moment, at least one heat exchange chamber is in the exothermic stage and at least another heat exchange chamber is in the endothermic stage, such that the heat of the flue gas flowing out of the fired heater can be recovered, thus improving the thermal efficiency of the fired heater. Moreover, the fired heater according to the present invention further has the advantages of small size, long life and easy use.

In one embodiment, the heat exchange chamber is provided with a regenerator, which can accumulate the residual heat in the flue gas and use the same to heat the outside air flowing through the regenerator, such that the residual heat of the flue gas can be recovered. In one specific embodiment, the regenerator is honeycomb ceramics and/or ceramic balls. Said regenerator is inert relative to the acidic liquid condensed from the flue gas, such that the problem of flue gas dew point corrosion can be avoided.

In one embodiment, a gas mixing tank is further provided between the flue gas waste heat recovery system and the air inlet, wherein an inlet of the gas mixing tank can be communicated with a first port of the heat exchange chamber and an outlet of the gas mixing tank is communicated with the air inlet. Thus, when the heat exchange chambers are just switched, the residual flue gas in the heat exchange chamber would first enter into the gas mixing tank, mix with the air with a high content of oxygen therein, and then enter into the fired heater body. In this manner, it is ensured the air in the fired heater body is of enough oxygen content, thus avoiding a flameout therein due to excessive low oxygen content in the air. In one preferred embodiment, the volume of the gas mixing tank is 6-10 times larger than the sum of the volumes of the heat exchanger chambers communicated with the gas mixing tank, such that the oxygen in the air supplied into the fired heater body from the gas mixing tank is ensured as more than 16.5% volume, thus ensuring that the flame will not be extinguished in the fired heater body. In another embodiment, at least one air distribution pipe communicated with the inlet of the gas mixing tank is provided in the gas mixing tank. Said air distribution pipe is used to achieve the rapid mixing of the flue gas with a low content of oxygen in the gas mixing tank and the air with a high content of oxygen therein. In one specific embodiment, the air distribution pipe is a hollow pipe longitudinally arranged along the gas mixing tank, and a plurality of through holes spaced from each other are provided along the longitudinal direction of said pipe.

In one embodiment, a first blower device is provided between the flue gas outlet and the flue gas waste heat recovery system, and a second blower device is provided between the flue gas waste heat recovery system and the air inlet. The continuous operation of the first blower device and the second blower device can reduce, or even eliminate, the flow of the gas or the air supplied into the fired heater body and/or the pressure fluctuation that are generated during the switchover between the heat exchange chambers, and reduce the influence on the fired heater body due to continuous operations, thus ensuring the stabilization of the temperature and the pressure in the fired heater body.

In one embodiment, a dirt catcher is provided between the first blower device and the flue gas waste heat recovery system. Said dirt catcher can remove the dust in the flue gas before the flue gas enters into the flue gas waste heat recovery system, so as to prevent the regenerator from being blogged, thus extending the service life of the fired heater.

In one embodiment, a heat exchanger is provided between the fired heater body and the flue gas waste heat recovery system. Heat exchanges between the flue gas flowing out of the fired heater body and the air supplied into the fired heater body are carried out with the help of the heat exchanger, which can further improve the flue gas heat recovery efficiency, thus improving the thermal efficiency of the fired heater.

In one embodiment, the lower end of the heat exchange chamber is provided with at least one liquid outlet, which is used to export the liquid condensed from the flue gas flowing out of the heat exchange chamber, thus avoiding hydrops in the lower part thereof.

In one embodiment, two heat exchange chambers are provided. In another embodiment, a first four-way valve and a second four-way valve used to achieve the switchover of the two heat exchange chambers are further provided, wherein the first four-way valve can be communicated with the first ports of the two heat exchange chambers, the flue gas outlet and the air inlet, and the second four-way valve can be communicated with the second ports of the two heat exchange chambers, the fume extractor and the outside air. The fired heater is simple, compact in structure, and capable of rapid switching between different heat exchange chambers.

According to a second aspect of the present invention, a method of using the fired heater with two heat exchange chambers as described above is provided, comprising, Step One: the flue gas flowing out of the fired heater body and the outside air are fed into the flue gas waste heat recovery system, Step Two: the first four-way valve is adjusted to such a state in which the first port of the first heat exchange chamber is communicated with the flue gas outlet, and the first port of the second heat exchange chamber is communicated with the air inlet; in the meantime, the second four-way valve is adjusted to such state in which the second port of the first heat exchange chamber is communicated with the fume extractor, and the second port of the second heat exchange chamber is communicated with the outside air, such that the first heat exchange chamber is in the endothermic stage and the second heat exchange chamber is in the exothermic stage, Step Three: when the heat storage of the first heat exchange chamber and the heat release of the second heat exchange chamber are finished respectively, the first four-way valve is adjusted to such a state in which the first port of the second heat exchange chamber is communicated with the flue gas outlet, and the first port of the first heat exchange chamber is communicated with said air inlet; in the meantime, the second four-way valve is adjusted to such a state in which the second port of the second heat exchange chamber is communicated with the fume extractor, and the second port of the first heat exchange chamber is communicated with the outside air, such that the second heat exchange chamber is in the endothermic stage and the first heat exchange chamber is in the exothermic stage, Step Two and Step Three are repeated.

In one embodiment, a preparation step is provided before Step One: the flue gas waste heat recovery system is adjusted to a working state. In the context of the present invention, the term "working state" refers to a state in which the flue gas waste heat recovery system can receive the flue gas flowing out of the fired heater body and the outside air.

In one embodiment, the minimum oxygen in the air supplied into the fired heater body is 16.5 volume %, which ensures the flame in the fired heater body will not be extinguished and the fired heater can operate continuously. In another embodiment, the heat storage time equals to the heat release time in the flue gas waste heat recovery system, which can also enable the fired heater to operate continuously. In one embodiment, the temperature of the air entering into the air inlet of the fired heater body fluctuates within the range of 0-5° C., thus reducing the fluctuation of the temperature in the fired heater body.

In the context of the present invention, the terms "upstream" and "downstream" should be understood with reference to the flow direction of gas. The term "the lower end of the heat exchange chamber" refers to the downstream end of the flue gas in the heat exchange chamber during used of the fired heater.

Compared with the prior arts, the present invention is advantageous in that the alternate endothermic and exothermic stages of heat exchange chambers of the fired heater can recover the heat in the flue gas flowing out of the fired heater body. The ceramic regenerators in the heat exchange chambers are inert relative to the acidic liquid condensed from the flue gas, such that the problem of low temperature flue gas dew point corrosion is avoided, thus further lowering the temperature of the flue gas discharged from the fired heater and improving the thermal efficiency of the fired heater. The gas mixing tank further provided between the heat exchange chamber and the fired heater body can ensure the content of oxygen in the air supplied into the fired heater body, thus avoiding the problem of a flameout in the fired heater body. Additionally, the first blower device and the second blower device can reduce or even eliminate the flowrate fluctuation of the flue gas or the air supplied into the fired heater body and/or the pressure fluctuation that are caused during the switchover between the heat exchange chambers, and reduce the influence on the fired heater body due to continuous operations, thus ensuring the stabilization of the temperature and the pressure in the fired heater. Moreover, the fired heater of the present invention has the advantages of small size, long life and easy use.

BRIEF DESCRIPTION OF DRAWINGS

The present invention will be described in more detail based on the following examples with reference to the appended drawings, wherein.

Figure 1:
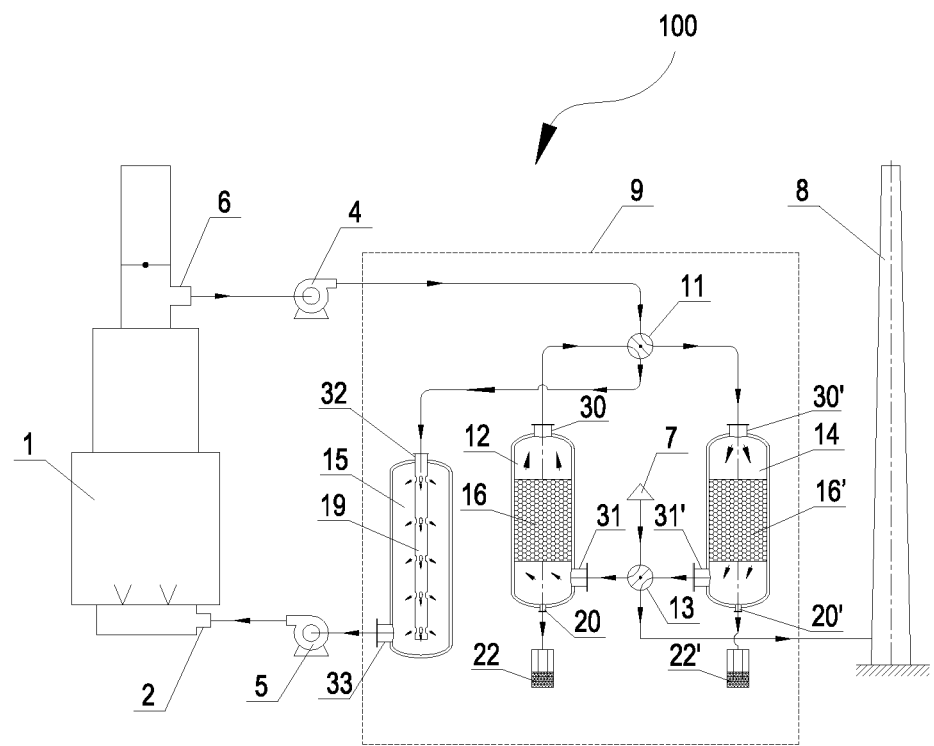
FIG. 1 is a schematic drawing of a first embodiment of the fired heater according to the present invention.

In the drawings, the same component is indicated with the same reference sign. The drawings are not drawn in real scale.

DETAILED DESCRIPTION OF EMBODIMENTS

The present invention will be further described with reference to the accompanying drawings.

Figure 4:
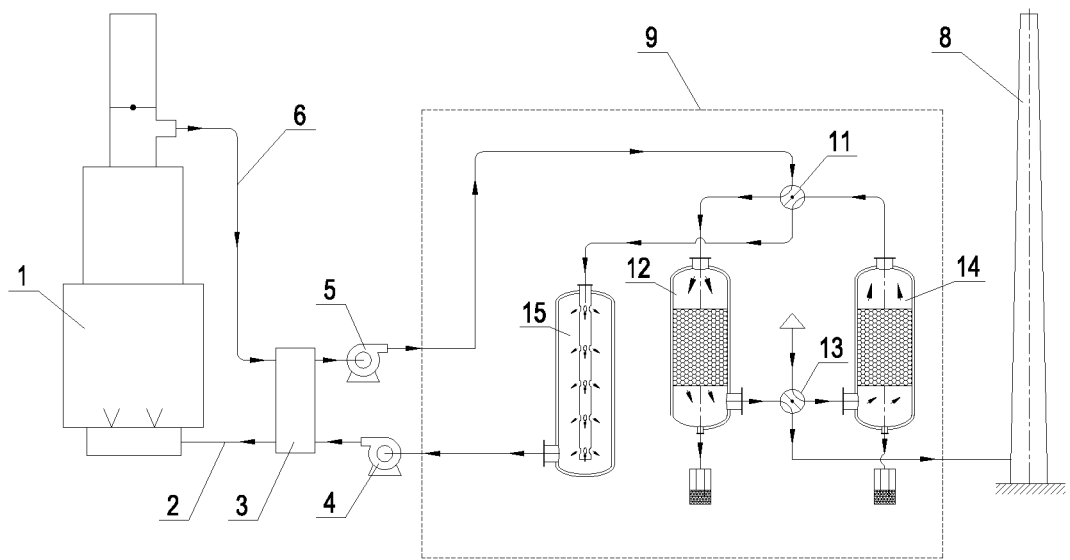
FIG. 4 is a schematic drawing of a third embodiment of the fired heater according to the present invention.

FIG. 1 schematically shows the fired heater 100 according to the present invention, including a fired heater body 1 and a flue gas waste heat recovery system 9 (as shown in the dashed box in FIG. 1) communicated with the fired heater body 1. The flue gas waste heat recovery system 9 is used to recover the heat of the flue gas coming from the fired heater body 1, and then use the same to heat the air supplied to the fired heater body 1, such that the thermal efficiency of the fired heater 100 is improved. To further improve the thermal efficiency of the fired heater 100, a heat exchanger 3 can be provided between the fired heater body 1 and the flue gas waste heat recovery system 9. As shown in FIG. 4, the flue gas coming from the fired heater body 1 and the air supplied therein flow through the heat exchanger 3 in countercurrent or crossflow to achieve the heat exchange between them.

As shown in FIG. 1, the flue gas waste heat recovery system 9 comprises two heat exchange chambers 12 and 14 that alternately accumulate heat or release heat, wherein a first port 30 or 30' of each of the heat exchange chambers 12 and 14 can be cut off from or communicated with an flue gas outlet 6 or an air inlet 2 of the fired heater body 1, while a second port 31 or 31' thereof can be cut off from or communicated with the outside air or a fume extractor 8. The heat exchange chambers 12 and 14 are filled with a regenerator 16 or 16' made of honeycomb ceramics or ceramic balls to achieve the accumulation or release of heat. The ceramic regenerator 16 or 16' can avoid the problem of the flue gas dew point corrosion. A liquid outlet 20 or 20' is provided at the lower end of the heat exchange chambers 12 and 14 respectively to export the condensate generated therein. In one embodiment, said condensate first enters into a condensate tank 22 or 22', then is treated therein to a neutral state, and then discharged to a sewage treatment system.

In the embodiment as shown in FIG. 1, the first port 30 of the heat exchange chamber 12 is communicated with the air inlet 2 of the fired heater body 1, and the second port 31 of the heat exchange chamber 12 is communicated with the outside air. And the first port 30' of the heat exchange chamber 14 is communicated with the flue gas outlet 6 of the fired heater body 1, and the second port 31' of the heat exchange chamber 14 is communicated with the fume extractor 8. In this circumstance, the heat exchange chamber 12 is in the exothermic stage and thus heats the air supplied into the fired heater body 1, while the heat exchange chamber 14 is in the endothermic stage. When the time of heat accumulation in the heat exchange chamber 14 reaches a set value, the heat exchange chamber 12 is switched to the endothermic stage and the heat exchange chamber 14 is switched to the exothermic stage. This procedure will be described in detail in the following. It should be understood that the flue gas waste heat recovery system 9 may include a plurality of heat exchange chambers in order to improve the amount of flue gas treated.

A first four-way valve 11 and a second four-way valve 13 are used in the embodiment as shown in FIG. 1 in order to achieve the switchover between the heat exchange chamber 12 and the heat exchange chamber 14. The first four-way valve 11 is communicated with the first port 30 of the heat exchange chamber 12, the first port 30' of the heat exchange chamber 14, the flue gas outlet 6 of the fired heater body 1 and the air inlet 2 of the fired heater body 1. The second four-way valve 13 is communicated with the second port 31 of the heat exchange chamber 12, the second port 31' of the heat exchange chamber 14, the fume extractor 8 and an air intake 7. The switchover between the exothermic stage and the endothermic stage of the heat exchange chamber 12 and the heat exchange chamber 14 could be achieved by adjusting the first four-way valve 11 and the second four-way valve 13 simultaneously. In one embodiment, the first four-way valve 11 and the second four-way valve 13 are set to be simultaneously operated, thus achieving the simultaneous switchover between the exothermic stage and endothermic stage of the heat exchange chamber 12 and the heat exchange chamber 14 in a convenient manner. These four-way valves are well known to one skilled in the art and will not be further explained here for the sake of conciseness.

A gas mixing tank 15 is further provided between the heat exchange chambers 12, 14 and the air inlet 2 of the fired heater body 1, wherein an inlet 32 of the gas mixing tank 15 is communicated with the first four-way valve 11 and an outlet 33 of the gas mixing tank 15 is communicated with the air inlet 2 of the fired heater body 1. Under the switching function of the first four-way valve 11, it is ensured that the gas mixing tank 15 is only in communication with the heat exchange chamber in the exothermic stage. During the switchover between the heat exchange chamber 12 and the heat exchange chamber 14, the residual flue gas in the heat exchange chamber first enters into the gas mixing tank 15 and then mix with the air with a high content of oxygen therein, such that a high content of oxygen in the air entering into the fired heater body 1 is ensured, thus avoiding the flameout therein. In one embodiment, the volume of the gas mixing tank 15 is 6~10 times larger than that of the heat exchange chamber 12 or the heat exchange chamber 14, such that the volume of oxygen in the air entering into the fired heater body 1 is ensured as more than 16.5% of the volume of the air, thus ensuring that the flame will not be extinguished in the fired heater body 1. Because the volume of the gas mixing tank 15 is comparatively large, to achieve the rapid mixing of the air therein, in one embodiment, at least one air distribution pipe 19 communicated with the inlet 32 of the gas mixing tank 15 is provided in the gas mixing tank 15. As shown in FIG. 1, the air distribution pipe 19 is a hollow pipe longitudinally arranged in the gas mixing tank 15. A plurality of vent holes is provided along the pipe, such that the flue gas entering into the gas mixing tank 15 can be mixed rapidly and evenly with the residual air therein. It is understood that swirl vanes, gas deflecting plates and other devices can also be arranged in the gas mixing tank 15 to improve the degree of air turbulence and further accelerate air mixing.

To ensure an airflow pressure head, as shown in FIG. 1, a first blower device 4 and a second blower device 5 are provided between the fired heater body 1 and the flue gas waste heat recovery system 9. In one embodiment, the first blower device 4 is selected as a blower and the second blower device 5 is selected as an induced draft fan. In the embodiment as shown in FIG. 1, the inlet of the first blower device 4 is communicated with the flue gas outlet 6 of the fired heater body 1, and the outlet of the first blower device 4 is communicated with the first four-way valve 11 so as to feed the flue gas into the flue gas waste heat recovery system 9. The inlet of the second blower device 5 is communicated with the outlet 33 of the gas mixing tank 15, and the outlet of the second blower device 5 is communicated with the air inlet 2 of the fired heater body 1 so as to feed the air into the fired heater body 1. The continuous operation of the first blower device 4 and the second blower device 5 can reduce, or even eliminate, the pressure fluctuation and the gas flow in the fired heater body 1 that are generated during the commutation of the first four-way valve 11 and the second four-way valve 13, i.e. the switchover between the heat exchange chamber 12 and the heat exchange chamber 14, thus ensuring the stabilization of the temperature and the pressure in the fired heater 100. In addition, the first blower device 4 is provided upstream of the flue gas waste heat recovery system 9, such that the first blower device 4 will not suffer from the problem of the flue gas dew point corrosion.

Figure 3:
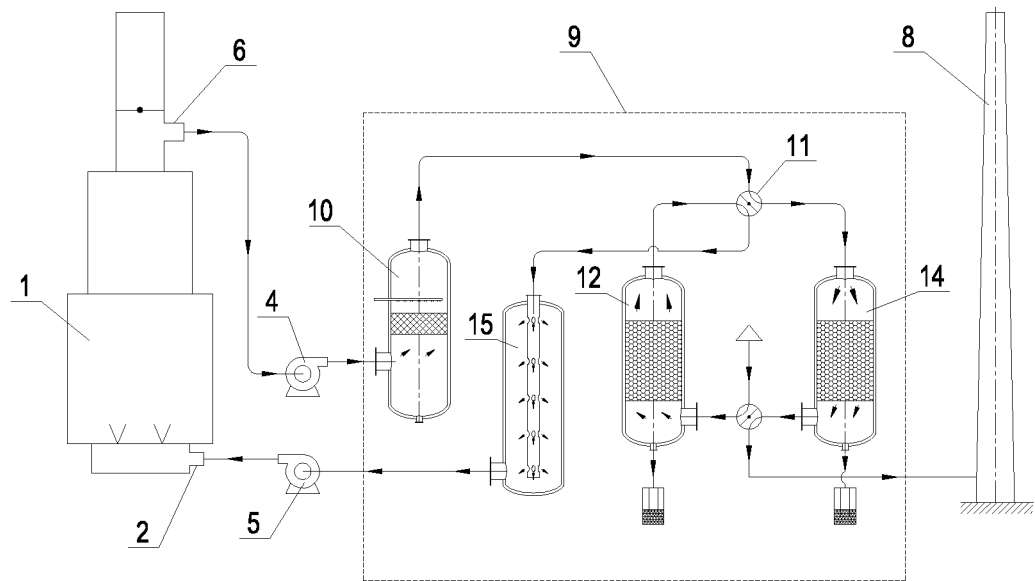
FIG. 3 is a schematic drawing of a second embodiment of the fired heater according to the present invention.

As shown in FIG. 3, when there is a large amount of dusts in the flue gas, a dirt catcher 10 can be provided between the first blower device 4 and the first four-way valve 11 to prevent the dust from clogging the heat exchange chambers 12 and 14. In one embodiment, the dirt catcher 10 can remove dust through a cloth bag, an electrostatic precipitator, or a filter layer which is flushed with water. Additionally, the dirt catcher 10 can provide a buffering effect on the commutation of the first four-way valve 11 and the second four-way valve 13, so as to reduce the impact on the fired heater 100 exerted by the air flow and pressure fluctuation during the commutation thereof.

Figure 2:
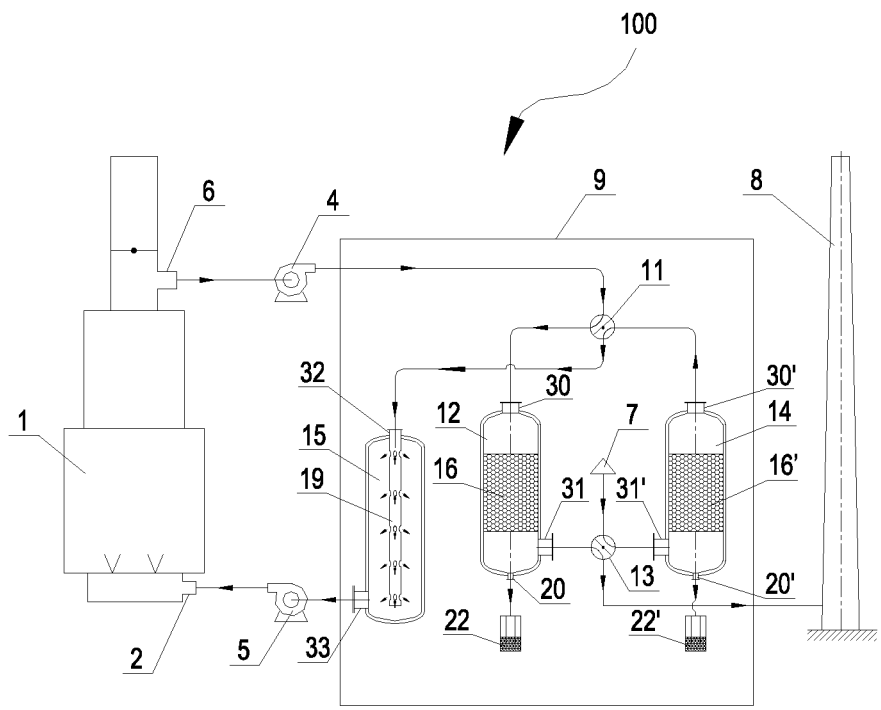
FIG. 2 is a schematic drawing of the fired heater in FIG. 1 after the heat exchange chambers are switched.

In the following the method of using the fired heater 100 according to the present invention will be discussed with reference to FIGS. 1 and 2. For the sake of simplicity, it is assumed that in the present invention the heat accumulation cycle of the heat exchange chamber is 30 s, the exothermic cycle is 30 s, and the flue gas dew point temperature is 100° C.

First, the flue gas waste heat recovery system 9 is adjusted to a working state. As shown in FIG. 1, the heat recovery system 9 is adjusted to such a state that the heat exchange chamber 12 is in the exothermic stage and the heat exchange chamber 14 is in the endothermic stage. A flue gas at a temperature of about 200° C. is discharged through the flue gas outlet 6 of the fired heater body 1, passes through the blower device 4, and guided by the first four-way valve 11 into the heat exchange chamber 14, where the residual heat is stored. After that, the flue gas is discharged through the second port 31' of the heat exchange chamber 14, guided by the second four-way valve 13 into the fume extractor 8, and discharged therefrom. The heat release of the flue gas in the heat exchange chamber 14 may generate condensate in the downstream part of the heat exchange chamber 14, which is discharged through the liquid outlet 20'.

The outside air entering through the air intake 7 is guided by the second four-way valve 13 into the heat exchange chamber 12 through the second port 31 thereof, and heated therein. Then the air is discharged out of the heat exchange chamber 12, guided by the first four-way valve 11 into the gas mixing tank 15, and then fed into the fired heater body 1 through the air inlet 2 thereof.

After 30 s, the working stages of the heat exchange chamber 12 and the heat exchange chamber 14 are switched. FIG. 2 shows the state when 0~3 s after the switching, i.e., the commutation of the first four-way valve 11 and the second four-way valve 13 is just finished; at this moment, the heat exchange chamber 12 is in the endothermic stage and the heat exchange chamber 14 is in the exothermic stage. The flow paths of the flue gas and the air will not be repeated here since they are similar with those before the switching. It should be noted that, when the air enters into the heat exchange chamber 14 where residual flue gas presents therein, it will mix with the residual flue gas, and then push it into the gas mixing tank 15 and thus mix with the air therein. In order to avoid a flameout in the fired heater body 1, due to low content of oxygen therein, the oxygen content in the mixed air should be 16.5% volume at minimum. Additionally, the temperature fluctuation of the air let in the gas mixing tank 15 is within the range of 0~10° C., and that of the air flowing from the gas mixing tank 15, i.e., the air flowing in the air inlet 2 of the fired heater body 1, is within the range of 0~5° C., thus reducing the fluctuation range of the air in the fired heater body 1.

During this period, the fired heater 100 is in a low-oxygen combustion state.

5~7 s after the switching, condensate fluid begins to appear in the heat exchange chamber 12, which will be discharged through the liquid outlet 20 at the bottom of the heat exchange chamber 12. The air entering into the fired heater body 1 will no longer be mixed with a flue gas, such that the fired heater 100 will be in a normal combustion state.

20~23 s after the switching, the temperature in the heat exchange chamber 12 gradually increases and condensate will not appear any more, such that the fired heater 100 is also in a normal combustion state.

27~30 s after the switching (but before the switching of the heat exchange chamber 12 and the heat exchange chamber 14), the temperature in the heat exchange chamber 12 gradually increases and condensate will not appear any more, such that the fired heater 100 is also in a normal combustion state.

After the commutation, the operations conducted during the period of 0~30 s before the switching described above are repeated.

In the fired heater 100 provided with a dirt catcher 10, the dust therein should be regularly cleaned.

Although this invention has been discussed with reference to preferable embodiments, it extends beyond the specifically disclosed embodiments to other alternative embodiments and/or use of the invention and obvious modifications and equivalents thereof. The scope of the present invention herein disclosed should not be limited by the particular disclosed embodiments as described above, but encompasses any and all technical solutions following within the scope of the following claims.

The invention claimed is:

1. A fired heater, comprising:
   a fired heater body with an air inlet and an flue gas outlet, and
   a flue gas waste heat recovery system communicated with said fired heater body, including a first and second heat exchange chambers, wherein a first port of each of said first and second heat exchange chambers is configured to communicate with said flue gas outlet or air inlet, and a second port of each of said first and second heat exchange chambers is configured to communicate with the outside air or with a fume extractor,
   wherein, when the first port of the first heat exchange chamber is communicated with said flue gas outlet and the second port of the first heat exchange chamber is communicated with said fume extractor, the first port of the second heat exchange chamber is communicated with said air inlet and the second port of the second heat exchange chamber is communicated with the outside air,
   wherein a gas mixing tank is provided between said flue gas waste heat recovery system and said air inlet, wherein an inlet of said gas mixing tank is configured to communicate with the first port of said first or second heat exchange chamber, and an outlet of said gas mixing tank is configured to communicate with said air inlet,
   wherein said fired heater further comprises a first four-way valve and a second four-way valve for switchover of said first and second heat exchange chambers, wherein said first four-way valve is configured to communicate with the first ports of said first and second heat exchange chambers, said flue gas outlet and air inlet, and said second four-way valve is configured to communicate with the second ports of said first and second heat exchange chambers, said fume extractor and the outside air, wherein an inlet of the gas mixing tank is communicated with the first four-way valve, and wherein the gas mixing tank is only in communication with the first or second heat exchange chamber in an exothermic stage.

2. The fired heater according to claim 1, wherein the volume of said gas mixing tank is 6-10 times larger than the sum of the volumes of the heat exchange chambers communicated with the gas mixing tank.

3. The fired heater according to claim 1, wherein at least one air distribution pipe communicated with the inlet of said gas mixing tank is provided in said gas mixing tank.

4. The fired heater according to claim 3, wherein said air distribution pipe is a hollow pipe longitudinally arranged along said gas mixing tank, and a plurality of through holes spaced from each other is arranged along said pipe.

5. The fired heater according to claim 1, wherein a first blower device is provided between said flue gas outlet and the flue gas waste heat recovery system.

6. The fired heater according to claim 1, wherein a second blower device is provided between said flue gas waste heat recovery system and the air inlet.

7. The fired heater according to claim 6, wherein a dirt catcher is provided between said first blower device and said flue gas waste heat recovery system.

8. The fired heater according to claim 1, wherein between said fired heater body and said flue gas waste heat recovery system a heat exchanger is provided, through which the heat exchange between the flue gas coming from said fired heater body and the air supplied into said fired heater body is achieved.

9. The fired heater according to claim 1, wherein at least one liquid outlet is provided at the lower end of any one of said first and second heat exchange chambers.

10. The fired heater according to claim 1, wherein a regenerator is provided in any one of said first and second heat exchange chambers.

11. The fired heater according to claim 10, wherein said regenerator is honeycomb ceramics and/or ceramic balls.

12. The fired heater according to claim 1, wherein two heat exchange chambers are provided.

13. A method of using the fired heater according to claim 1, including:

Step A: feeding the flue gas coming from said fired heater body and the outside air into said flue gas waste heat recovery system, Step B: adjusting said first four-way valve to such a state in which the first port of the first heat exchange chamber is communicated with the flue gas outlet, and the first port of the second heat exchange chamber is communicated with the air inlet; in the meantime, adjusting said second four-way valve to such state in which the second port of the first heat exchange chamber is communicated with said fume extractor, and the second port of the second heat exchange chamber is communicated with the outside air, such that said first heat exchange chamber is in the endothermic stage and said second heat exchange chamber is in the exothermic stage, Step C: when heat accumulation of the first heat exchange chamber and the heat release of the second heat exchange chamber are finished respectively, adjusting said first four-way valve to such a state in which the first port of the second heat exchange chamber is communicated with the flue gas outlet, and the first port of the first heat exchange chamber is communicated with said air inlet; in the meantime, adjusting said second four-way valve to such a state in which the second port of the second heat exchange chamber is communicated with said fume extractor, and the second port of the first heat exchange chamber is communicated with the outside air, such that said second heat exchange chamber is in the endothermic stage and said first heat exchange chamber is in the exothermic stage, and repeating Step B and Step C.

14. The method according to claim 13, wherein a preparation step is provided before Step A, in which said flue gas waste heat recovery system is adjusted to a working state.

15. The method according to claim 13, wherein a minimum oxygen content in the air supplied into said fired heater body is 16.5% volume.

16. The method according to claim 13, wherein a heat accumulation time equals to the heat release time in said flue gas waste heat recovery system.

17. The method according to claim 15, wherein a temperature of the air entering into said air inlet fluctuates within the range of 0-5° C.

18. The fired heater according to claim 1, wherein when the first and second heat exchange chambers are just switched, residual flue gas in the heat exchange chamber enters into the gas mixing tank and is mixed with air with a high content of oxygen, prior to entering into the fired heater body.

* * * * *